(No Model.)
W. S. HAVEN.
COMBINED GANG AND SUBSOIL PLOW.
No. 308,667. Patented Dec. 2, 1884.
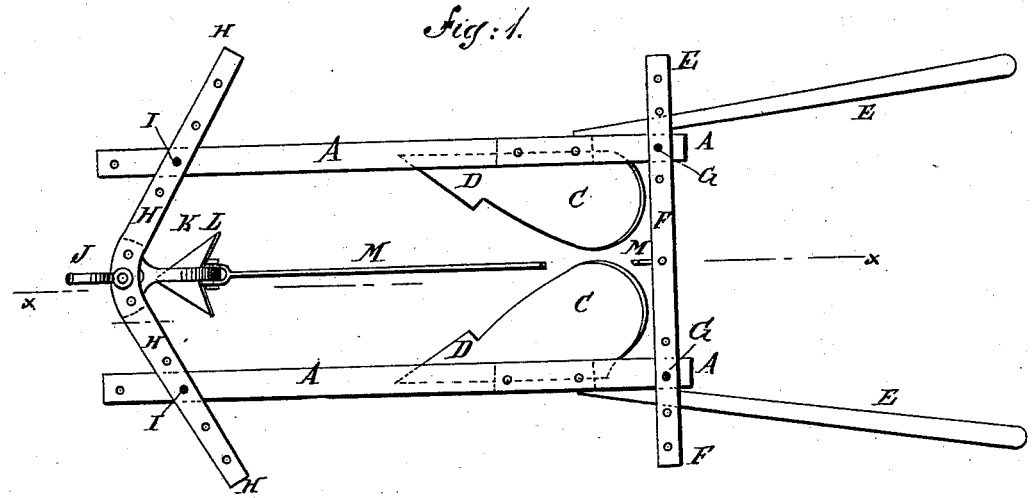
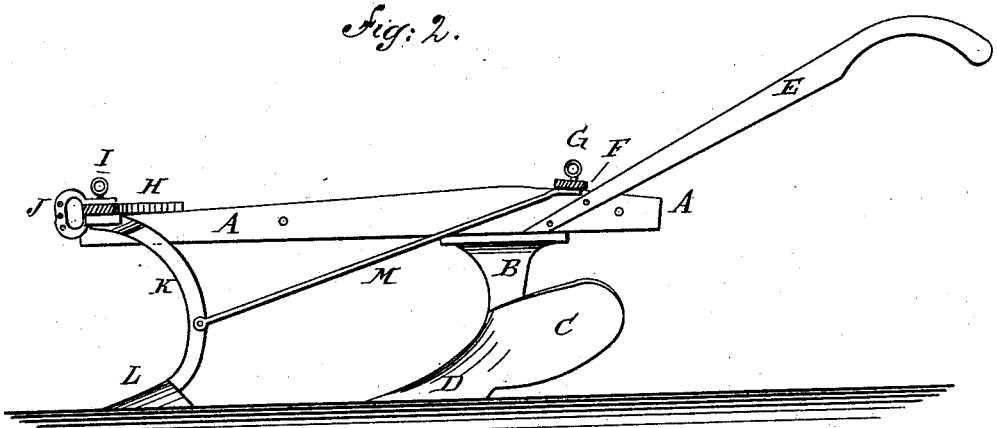
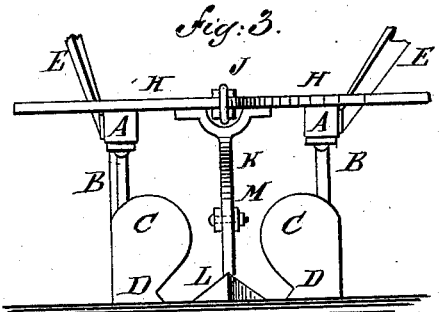
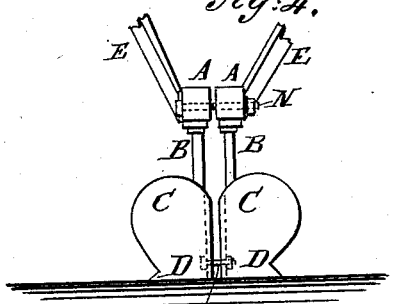
WITNESSES:
INVENTOR:
W. S. Haven
BY Munn & Co.
ATTORNEYS.

UNITED STATES PATENT OFFICE.

WILLIAM S. HAVEN, OF SHREVEPORT, LOUISIANA.

COMBINED GANG AND SUBSOIL PLOW.

SPECIFICATION forming part of Letters Patent No. 308,667, dated December 2, 1884.

Application filed June 27, 1884. (No model.)

*To all whom it may concern:*

Be it known that I, WILLIAM S. HAVEN, of Shreveport, in the parish of Caddo and State of Louisiana, have invented a new and useful Improvement in Combined Gang and Subsoil Plows, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a sectional side elevation of the same, taken through the line *x x*, Fig. 1. Fig. 3 is a front elevation of the same. Fig. 4 is a front elevation of the same, shown as arranged for opening a ridge.

The object of this invention is to facilitate the preparation of land cultivated in ridges to receive the next crop.

The invention consists in the peculiar construction and arrangement of parts, as hereinafter fully described, and pointed out in the claims.

A represents the beams, B the standards, C the mold-boards, D the shares, and E the handles, of two ordinary plows, one of which is a right-hand plow and the other a left-hand plow. The rear parts of the beams A are connected by a cross-bar, F, which is secured to them by bolts G. The forward parts of the beams A are connected by a cross-bar, H, which is secured to them by bolts I.

Several holes are formed in the beams A and cross-bars F H, to receive the bolts G I, so that the plows can be adjusted at a greater or less distance apart, as may be required. The cross-bar H is curved, as shown in Fig. 1, and to its center is secured the clevis J, to which the draft is applied.

To the center of the cross-bar H is also secured the upper end of the standard K, to the lower end of which is secured the subsoil-plow L. The standard K of the subsoil-plow L is strengthened against the draft-strain by the brace M, the forward end of which is secured to the said standard K, and the rear end is secured to the center of the rear cross-bar, F, as shown in Figs. 1 and 2. When the plow thus arranged is drawn along the water-furrow or the hollow between two ridges, the subsoil-plow L cuts off the tap-roots of the weeds growing in the bottoms of the said furrow and loosens the soil, and the plows B C D break down the sides of the ridges and turn them into the said furrow to lay the foundation for a new ridge. The cross-bars F H are then detached, and the plows B C D are placed side by side, with their landsides toward each other, and are fastened together by the bolts N through the beams and the bolts O through the landsides. The handles E can be detached and secured to the other sides of the beams A to bring them into proper position; or the said handles can be so formed as to be in proper position in both arrangements without being changed. As thus arranged the double plow is drawn through the old ridges, opening them and turning the soil into the furrows previously formed, so that the new ridges can be readily completed and the labor of preparing the land for the next crop greatly lessened.

Having thus described my invention, I claim as new and desire to secure by Letters Patent—

1. The combination, in a plow, of two beams, each provided with a handle and carrying a right and left hand plow, respectively, front and rear bars for adjustably connecting the said beams together, and a subsoil-plow secured to the forward connecting-bar midway of its length, substantially as herein shown and described.

2. In a plow, the combination, with the beams A, one provided with a right-hand and the other with a left-hand plow, of the cross-bar F H, adjustably connected to the beams, the subsoil-plow K L, connected to the center of the cross-bar H, and the brace M, extending from the subsoil-plow to the rear cross-bar, F, substantially as herein shown and described.

WILLIAM S. HAVEN.

Witnesses:
CAL D. HICKS,
J. P. ALBAN.